June 23, 1970 W. V. CHERY 3,516,305

TORQUE CONVERTER

Filed May 9, 1968

INVENTOR.
WALTER VALDEMAR CHERY

BY

Charles L. Lorenchuk
atty

United States Patent Office 3,516,305
Patented June 23, 1970

3,516,305
TORQUE CONVERTER
Walter Valdemar Chery, 744 Alden St.,
Meadville, Pa. 16335
Filed May 9, 1968, Ser. No. 727,937
Int. Cl. F16h *15/50, 15/04*
U.S. Cl. 74—796         15 Claims

ABSTRACT OF THE DISCLOSURE

A planetary friction type torque converter which provides a variable drive and speed reducer. The torque converter uses preloaded planetary rolling elements with ball or roller elements as part of the reactive members. The reactive members are in the form of rings having an internal surface contoured about a radius slightly larger than the radius of contour of the planet rollers. The outside lateral edges of the reactive members have cam surfaces on them, cam members having cam surfaces facing the reactive members. Ball cams are disposed between the reactive members and the cam surfaces. When a force is exerted on the input shaft, it is transmitted through the balls to the torque converter frame. Thus, the reactive members tend to be rotated relative to the frame. Relative rotation between the reactive members and the frame results in the balls moving to higher points on the cam surfaces, thus forcing the two reactive members toward each other. This force is opposed by the springs between the planet rollers. This reaction brings the planet rolls into engagement with a smaller radius part of the sun rolls and likewise a smaller radius portion of the reactive members. A limit stop is provided to limit the extent of rotation of the reactive members.

---

This application constitutes an improvement over previous planetary friction drives in that a combination of a torque converter, variable drive, and reducer is provided in one unit design.

The above is accomplished by using individually preloaded planetary rolling elements with ball or roller cams as a part of reactive members.

It is, accordingly, an object of the invention to provide a drive with a maximum efficiency for machine and tool shop equipment, for example:

(a) When a lathe or milling machine, etc. are used for production, the drive can be set as a torque converter to maintain constant cutting speed, thus providing maximum efficiency and longer tool life. (R.p.m. is changed infinitely on demand at the constant HP.)

(b) When a lathe or milling machine is desired to operate at certain r.p.m., then unit is set as a variable drive.

Another object of the invention is to provide an improved drive that can perform identically in either direction (forward or reverse in case of a lathe and milling machine, etc.).

Another object of the invention is to provide a torque converter where a range of a torque multiplication can be changed.

Another object of the invention is to provide the combination drive torque converter, variable drive (reducer) simple in construction and low in manufacturing cost.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawings:

FIG. 1 is a diagrammatic cross sectional view taken on line B—B of FIG. 1a;

Figure 1:
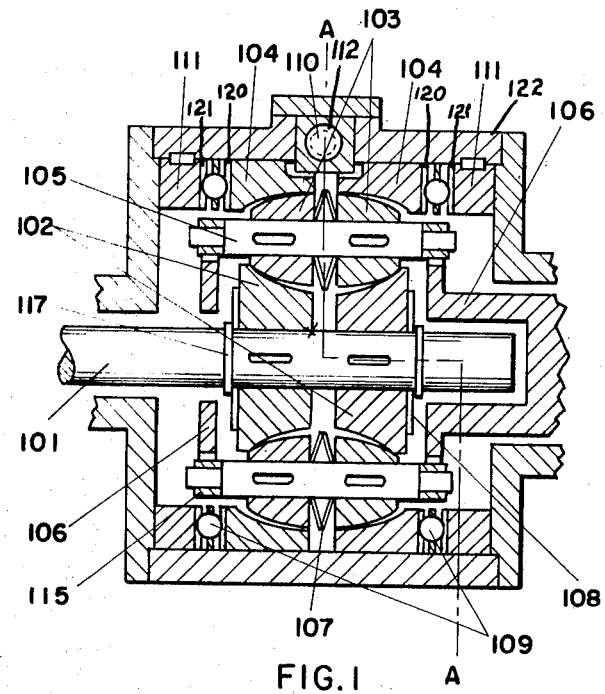

The transmission disclosed herein is made up basically of a frame 122 that can be fixed to a machine on which the torque converter is to be used. The input from a prime mover would be connected to the input shaft 101 and the output to a planetary cage 106. The planet rolls 103 have an outside surface that conforms generally to the curvature of an ellipsoid. The surfaces on the reaction members 104 and the sun rollers 102 have a radius of curvature considerably greater than the radius of curvature of the outside surface of the planet rollers. The reaction members 104 are in the form of rings and have a cam surface on their outer face 120 and are rotatable inside the frame. The cam surfaces 120 and 121 urge the reaction members toward each other when a load is compressed between the input shaft 101 and the output planetary cage 106.

Figure 5:
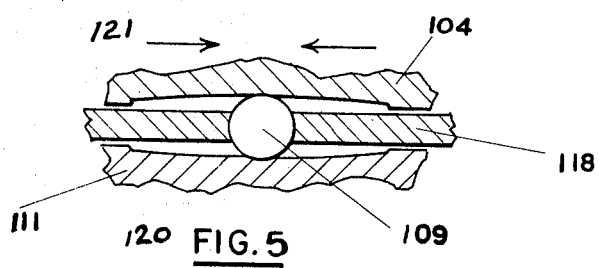

Now with more particular reference to the transmission shown in FIG. 1, the transmission has planet rolls 103 and sun rollers 102, placed inside of the planetary cage 106. The sun rolls 102 are keyed to shaft 101. Planet rolls 103 are received on the planet shaft 105, planet rolls 103 are individually preloaded and urged apart by Belleville springs 107 or other suitable means, keyed and free to slide inward and outward on shafts 105. Reactive races 104 have a larger radius in cross section than planet rolls 103. The reactive races 104 have cam portions as shown in FIG. 5, and through the balls or rollers 109 are held in position by cams 111, which are keyed in the housing and thereby fixed thereto.

Figure 4:
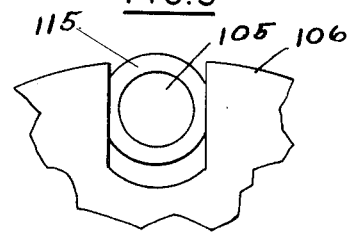
FIGS. 4 and 5 are detailed views of parts of the invention.

The ends of planetary shafts 105 are received in bushings 115 and bushings 115 can slide radially in planetary cage 106 as shown on FIG. 4.

Bushings 115, when placed at the end of shafts 105 (instead of inside of planet rollers 103, as a common practice) are not subjected to forces developed between the planet rollers 103 and inner and outer reactive races 104, and therefore the wear of the bushings is reduced and the efficiency of the drive is improved.

Reactive races 104 can be rotated clockwise or counter clockwise by adjusting screw 110, nut 112 with a groove defined by spaced lugs 113 which contacts lug 116 between recesses 114.

The sun rollers 102 are keyed to input shaft 101 and held against Belleville springs 108 and snap rings 117 by preload springs 107 through planet rollers 103. Belleville springs 108 are constant load type, are compressed to flat position or approaching it and used to control an initial load on the rolling elements 102 and 103, compensating for variation of parts and simplifying assembly. When the unit is set as a torque converter, the power flows from input shaft 101 to sun rollers 102 which in turn roll on planet rollers 103 which roll on reactive rings 104 and through planetary shafts 105 and bushings 115 to planetary cage 106.

When an output load stays uniform, reactive rings 104 are held in corresponding position by roller or ball cams 109 so that the ball cam 109 is at a position along cams 120 and 121 that will result in a force to balance the load on the output. When output load is increased, the forces on reactive rings 104 are also increased and these forces will rotate reactive rings 104 in relation to cams 111 and move the reactive rings 104 inward. In turn, reactive rings 104 will urge planet rollers 103 toward each other and radially, changing the speed ratio infinitely until a balance of forces occurs.

When preload springs 107 are compressed to flat position, the unit will reach the maximum speed reduction and torque multiplication. At that moment, planetary rolls 103 and preload springs 107 become a solid assembly and any further overload will increase a preload by cams 111 on rolling elements proportionally and therefore a slippage will be prevented.

Reactive rings 104 have outwardly facing cam surfaces 120. Cams 111 are fixed to the frame 122 and have inwardly facing cam surfaces. When no load is imposed on input shaft 120, the rollers 109 will be at the low point on cam surfaces 120 and 121, as shown in FIG. 5. Thus, as torque on input shaft increases reactive rings 104 will be rotated relative to cams 111. As the relative rotation continues, ball cams 104 will move further and further up the cam surfaces 120 and 121 and force reactive rings 104 further from cams 111 and closer toward each other.

As reactive rings move toward each other, the reactive rollers 103 will have three things happen. First, they will move toward each other compressing springs 107. Secondly, shafts 105 will move radially inward toward shaft 106. Thirdly, the smaller radius portion of reactive rings 104 will engage the outer periphery of planet rollers 103 and also a smaller radius portion of the surface of sun rollers 102 will also engage the planet rollers 103. Thus, the reduction ratio of the torque converter will be changed.

Figure 1A:
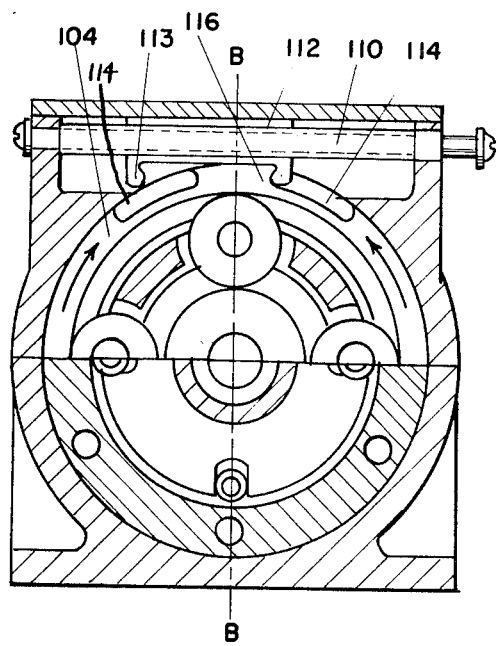
FIG. 1a is a cross sectional view taken on line A—A of FIG. 1.

As it is shown in FIG. 1a, the torque converter is set for a full range and reactive rings 104 can turn counterclockwise for a full length of the recess 114, or a full length of a cam portion, FIG. 5. If the range of the torque converter is desired to be changed, then by adjusting screw 110, through nut 112, portions 113 and 116, reactive rings 104 can be turned counter-clockwise to desired position, maximum speed will be reduced, while a low speed remains the same.

When the unit is used as a variable drive, the method of adjusting is the same as mentioned above.

When adjustment is set, so that the preload springs 107 are compressed to a flat position, the unit can be used as a reducer, which will be able to maintain a speed even in case of overload due to the fact that cams 111 will provide an additional preload proportionally. Under normal load, the rolling elements still are preloaded individually with a full advantage of minimum noise and greater capacity.

Left lug 113 of nut 112 and left recess 114 are used for a rotation of the unit in opposite direction.

The preload springs 107 are selected in such a manner, that the unit can carry 10 to 15% overload, so that a speed can be maintained when used as a variable drive and in case of overload the unit automatically functions as a torque converter.

Figure 2:
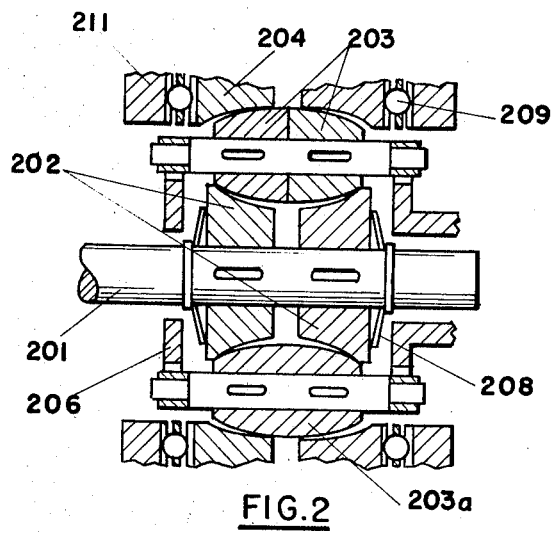
FIG. 2 is a view similar to FIG. 1 of another embodiment of the invention.

FIG. 2 shows the same arrangement as FIG. 1, minus preload springs 107. In this case, Belleville springs 208 are used as preload springs, sun rollers 202 slide on input shaft 201, while planet rollers 203 are a solid single unit and can slide radially on the planetary cage only. Because planet rollers 203 in this case function as one solid part, they can be replaced by one roller 203a as shown in the lower part of the cross section on FIG. 2.

The function of the unit is identical to FIG. 1, except that its capacity is reduced due to the absence of the individual preload on planet rolls 203 that is present in the embodiment of FIG. 1 due to springs 107.

Figure 3:
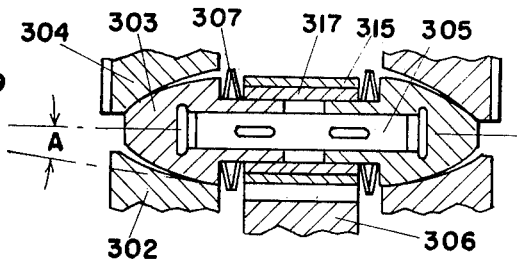
FIG. 3 is a detailed view of parts of another embodiment of the invention.

FIG. 3 shows a design in which a planetary cage 306 is placed between planet rollers 303. In this case, planet rollers 303 are keyed to planet pin 305 and can slide on pin 305 and are preloaded by Belleville springs 307, which are placed between rollers 303 and sleeve 317. Sleeve 317 receives planet pin 305 which can slide in it inward and outward, but due to the preload by springs 307 sleeve 317 will rotate as a common part with planet rollers 303 in a bearing type bushing 315. Bearing type bushing 315 is received by planetary cage 306 in the same manner as disclosed in FIG. 4.

FIG. 5 shows the two way cam arrangement which makes it possible to operate the unit in either direction. Cam 120 is a part of outer races and can move in relation to cam 111, which is stationary. Ball 109 is held in separator 118, can rise on cam portions of cam 111 and move cam 101 away from cam 111. As it is shown, the position of the ball 109 corresponds to a maximum speed of the unit.

The type of spherical curved planet rollers shown has a large radius to provide longer life and carry heavy load and the center of spherical surface is selected so that the pressure angle A FIG. 3 (the angle between a tangent and axial line) of rollers 303 is approximately 30 degrees and less to provide maximum pressure at the contact points and these require light preload on rolling elements 103 and reactive cams 111, FIG. 1. For lighter units and greater speed range the pressure angle can be over 30 degrees.

In FIG. 1 and FIG. 2, the relation between planet rollers (contact points), sun rollers and outer reactive rings shown for a maximum and FIG. 3 for a minimum speed transmitted.

The foregoing specification sets forth the invention in its preferred practical forms but the structure shown is capable of modification within a range of equivalents without departing from the invention.

The embodiments of the invention in which an exclusive property or privilege is claimed are defined as follows:

1. A torque converter comprising a frame,
   two spaced annular reaction members in said frame,
   cam means between said frame and said reaction means adapted to move said reaction members toward each other and away from each other,
   a planetary assembly in said frame,
   said planetary assembly comprising spaced roller members having inclined outer peripheral surfaces,
   an input shaft, spaced sun members on said input member,
   and inclined outer peripheral surfaces on said sun members engaging said inclined outer peripheral surfaces on said roller members and inclined inner peripheral surfaces on said reaction members engaging said outer peripheral surfaces on said roller members,
   and resilient means urging said spaced roller members from each other and into engagement with said reaction members,
   said reaction members engaging a smaller diameter portion of said roller members when said torque on said input shaft is increased.

2. The torque converter recited in claim 1 wherein resilient means is provided between said roller members urging said roller members apart.

3. The torque converter recited in claim 1 wherein resilient means is provided on said input shaft urging said sun members together.

4. The torque converter recited in claim 1 wherein means is provided on said planetary assembly to allow said roller members to move toward and away from said input shaft,
   said roller members being restrained from moving circumferentially relative to said planetary assembly,
   and an output member connected to said planetary assembly.

5. The torque converter recited in claim 1 wherein said planetary assembly comprises a planetary cage having two spaced members,
   planet shafts supported on said spaced members,
   and said planet rollers disposed on said planet shafts.

6. The torque converter recited in claim 5 wherein said shafts are received in spaced radially extending slots in said spaced members.

7. The torque converter recited in claim 1 wherein said roller members are disposed on each side of said cage.

8. The torque converter recited in claim 1 wherein:
said cam means comprises cam members on said reaction members,
said cam means facing cam means supported on said frame.

9. The torque converter recited in claim 8 wherein said cam means comprises ball members disposed between said reaction members and said cam means on said frame.

10. The torque converter recited in claim 1 wherein said roller members are in the form of a single member disposed between axially spaced said reaction members.

11. The torque converter recited in claim 1 wherein said roller members are generally in the shape of a longitudinal half of an ellipsoid with the small end of said ellipsoid extending outward,
and said inclined surfaces on said reaction members comprising a surface having a radius of curvature greater than the radius of curvature of said ellipsoid surface.

12. The torque converter recited in claim 11 wherein said planetary members each comprise a single generally ellipsoidal shaped member engaging one said reaction member on one of its ends and the other said reaction member on its other said end.

13. The torque converter recited in claim 11 wherein said inclined surface on said sun members is curved about a radius of curvature slightly greater than the radius of curvature of said roller members.

14. The torque converter recited in claim 11 wherein said cam means between said reaction members and said frame comprises an outwardly facing cam surface on each said reaction member,
said cam surface on each said reaction member having a low spot and inclining from said low spot and toward said frame on each side of said low spot,
and said frame having two spaced cam surfaces with said reaction members therebetween, said cam surfaces on said frame facing said cam surface on said reaction member,
said cam surface on said frame inclining toward a low spot on said frame and from said reaction members,
and at least one ball member between each said reaction member and said frame, whereby said reaction members are forced toward each other when a torsional force is applied to said input shaft.

15. A torque converter comprising a planetary assembly, having spaced planet means,
said planet means being of inclined rollers and in rolling contact with two sun members spaced on input shaft, and with two annular reaction members spaced in frame,
said planet means being in rolling contact at their smaller diameter with sun members and their large diameter with annular reaction members when said torque on said output shaft is minimum, and
said planet means being in rolling contact at their larger diameter with sun members and their smaller diameter with annular reaction members when said torque on said output shaft is maximum,
said planetary assembly having resilient means disposed between planet means urging said planet means into engagement with said sun members,
said annular reaction members having cam portions outwardly disposed and in rolling contact with rollers, said rollers in turn being in rolling contact with inwardly disposed cam portions of the reaction cam members which are locked in the frame.

References Cited
UNITED STATES PATENTS

| 2,342,071 | 2/1944 | Bade | 74—796 |
| 2,941,422 | 6/1960 | Barish | 74—796 |
| 3,293,947 | 12/1966 | Chery | 74—796 |
| 3,299,743 | 1/1967 | Stockton | 74—796 X |

LEONARD H. GERIN, Primary Examiner

U.S. Cl. X.R.

74—190.5